United States Patent
Schreyer et al.

(10) Patent No.: US 11,754,145 B2
(45) Date of Patent: Sep. 12, 2023

(54) BALANCE SHAFT ASSEMBLY

(71) Applicant: Schaeffler Technologies AG & Co. KG

(72) Inventors: Hannes Schreyer, Gerhardshofen (DE); Stefan Dorn, Hollfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 206 days.

(21) Appl. No.: 17/293,366

(22) PCT Filed: Nov. 12, 2019

(86) PCT No.: PCT/DE2019/100971
§ 371 (c)(1),
(2) Date: May 12, 2021

(87) PCT Pub. No.: WO2020/098879
PCT Pub. Date: May 22, 2020

(65) Prior Publication Data
US 2022/0010860 A1    Jan. 13, 2022

(30) Foreign Application Priority Data
Nov. 16, 2018 (DE) ............ 10 2018 128 830.1

(51) Int. Cl.
*F16F 15/26* (2006.01)
*F16C 19/36* (2006.01)

(52) U.S. Cl.
CPC .......... *F16F 15/267* (2013.01); *F16C 19/361* (2013.01); *F16C 2360/00* (2013.01);
(Continued)

(58) Field of Classification Search
CPC .. F16F 15/267; F16F 2222/08; F16F 2226/04; F16F 2232/02; F16C 19/361;
(Continued)

(56) References Cited

U.S. PATENT DOCUMENTS

| 2009/0044779 A1* | 2/2009 | Solfrank | ............... F16F 15/267 |
| | | | 123/192.2 |
| 2009/0257702 A1 | 10/2009 | Solfrank | |

(Continued)

FOREIGN PATENT DOCUMENTS

| DE | 19926406 A1 | 12/2000 |
| DE | 102008018545 A1 | 10/2009 |

(Continued)

OTHER PUBLICATIONS

International Search Report for Corresponding PCT/DE2019/100971.

*Primary Examiner* — Grant Moubry
(74) *Attorney, Agent, or Firm* — Davidson, Davidson & Kappel, LLC

(57) ABSTRACT

A balance shaft includes an unbalanced shaft (3) comprising a bearing journal (8, 9), the periphery of which is merely partially cylindrical. The cylindrical partial periphery (10) of the bearing journal is oriented toward the shaft imbalance. The balance shaft also includes a needle roller cage assembly (15); and a bearing ring (13), which extends around the bearing journal, lies against the cylindrical partial periphery and forms the inner raceway of the needle roller cage assembly. The cage (27) of the needle roller cage assembly is designed to run on the end faces of the bearing ring axially on both sides by means of radially inwardly extending projections.

18 Claims, 2 Drawing Sheets

(52) U.S. Cl.
CPC ....... *F16F 2222/08* (2013.01); *F16F 2226/04* (2013.01); *F16F 2232/02* (2013.01)

(58) Field of Classification Search
CPC .......... F16C 19/463; F16C 17/02; F16C 3/20; F16C 21/00; F16C 33/08; F16C 2360/22
See application file for complete search history.

(56) References Cited

U.S. PATENT DOCUMENTS

| | | | |
|---|---|---|---|
| 2009/0297085 A1* | 12/2009 | Solfrank | F16F 15/267 384/571 |
| 2009/0308343 A1 | 12/2009 | Herzog et al. | |
| 2011/0023809 A1 | 2/2011 | Solfrank | |
| 2012/0045159 A1* | 2/2012 | Hess | F16C 33/4635 384/572 |
| 2012/0125281 A1 | 5/2012 | Herzog et al. | |
| 2013/0156359 A1 | 6/2013 | Flender et al. | |
| 2013/0170779 A1* | 7/2013 | Eckhoff | F16C 35/067 384/565 |
| 2014/0301683 A1* | 10/2014 | Higdon | F16C 33/4629 384/577 |
| 2014/0311280 A1 | 10/2014 | Solfrank et al. | |
| 2018/0156274 A1 | 6/2018 | Nonato De Paula et al. | |

FOREIGN PATENT DOCUMENTS

| | | | | |
|---|---|---|---|---|
| DE | 102011088603 | A1 | 6/2013 | |
| DE | 202013100896 | U1 | 6/2014 | |
| DE | 102016210480 | A1 | 1/2018 | |
| DE | 202017102212 | U1 | 7/2018 | |
| EP | 1115984 | A1 | 7/2001 | |
| EP | 2426374 | B1 | 2/2017 | |
| EP | 2459899 | B1 | 2/2017 | |
| JP | 2002525533 | A | 8/2002 | |
| JP | 2006329313 | A | 12/2006 | |
| JP | 2009534595 | A | 9/2009 | |
| JP | 2018059629 | A | 4/2018 | |
| WO | WO-2011012239 | A2 * | 2/2011 | ............. F16C 17/02 |
| WO | WO2012019831 | A1 | 2/2012 | |

\* cited by examiner

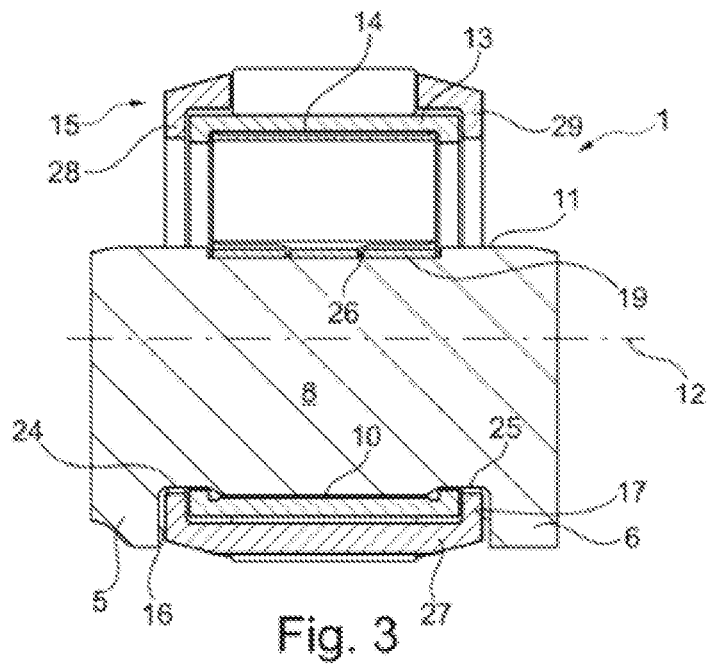
Fig. 3
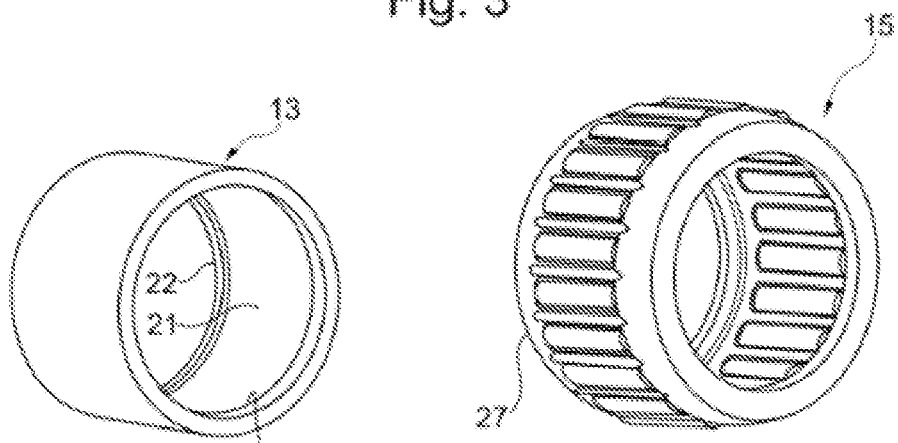
Fig. 4   Fig. 5
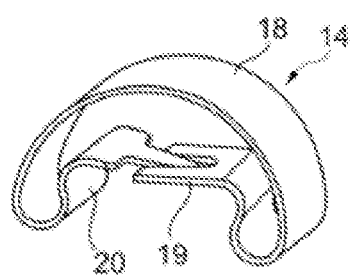 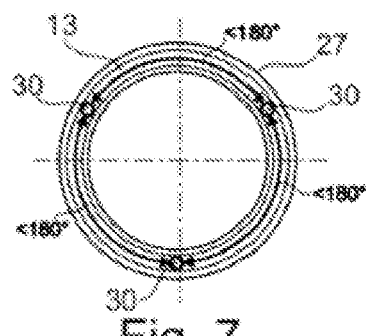
Fig. 6   Fig. 7

BALANCE SHAFT ASSEMBLY

CROSS-REFERENCE TO RELATED APPLICATIONS

This application is the U.S. National Phase of PCT Appln. No. PCT/DE2019/100971 filed Nov. 12, 2019, which claims priority to DE 10 2018 128 830.1 filed Nov. 16, 2018 and DE 10 2019 101 319.4 filed Jan. 18, 2019, the entire disclosures of which are incorporated by reference herein.

The present disclosure relates to a balance shaft for compensating mass forces and/or mass moments of a reciprocating piston internal combustion engine.

BACKGROUND

A generic balance shaft is known, for example, from DE 10 2008 018 545 A1. Other built balance shafts with partially cylindrical bearing journals, bearing ring and rolling bearings rolling thereon are known, for example, from EP 2 459 899 B1, EP 2 426 374 B1 and DE 10 2016 210 480 A1.

SUMMARY

The present disclosure discloses a constructed balance shaft with a structurally improved bearing point. The balance shaft includes an unbalanced shaft having a bearing journal, the periphery of which is merely partially cylindrical, the cylindrical partial periphery of the bearing journal being oriented toward the shaft imbalance, a needle roller cage assembly and a bearing ring, which extends around the bearing journal, lies against the cylindrical partial periphery and forms the inner raceway of the needle roller cage assembly The cage of the needle roller cage assembly is designed to run on the end faces of the bearing ring axially on both sides by means of radially inwardly extending projections. The axial guidance of the cage on both sides takes place directly on the bearing ring, so that the axial position of the needles relative to their inner raceway on the bearing ring only differs within the relevant component tolerances of the cage, the needles and the bearing ring and consequently only to a small extent. For this reason, the comparatively large overall dimension of the relevant component tolerance chains, which, as in the prior art, extend from the bearing ring via the bearing journal and adjoining shaft sections to the needle roller cage assembly, has no effect on the axial position of the needles on the bearing ring, according to the present disclosure.

BRIEF SUMMARY OF THE DRAWINGS

An exemplary embodiment of a balance shaft according to the present disclosure is explained in the following description and illustrated in the figures. In the figures:

FIG. 3: shows one of the bearing points according to FIG. 1 in an enlarged longitudinal section;
FIG. 4: shows the unbalanced shaft according to FIG. 3 as a perspective individual part;
FIG. 5: shows the needle roller cage assembly according to FIG. 3 as a perspective individual part;
FIG. 6: shows the clamping element according to FIG. 3 as a perspective individual part;
FIG. 7: shows a schematic representation of the axial start-up of the needle roller cage assembly on the bearing ring.

DETAILED DESCRIPTION

Figure 1:
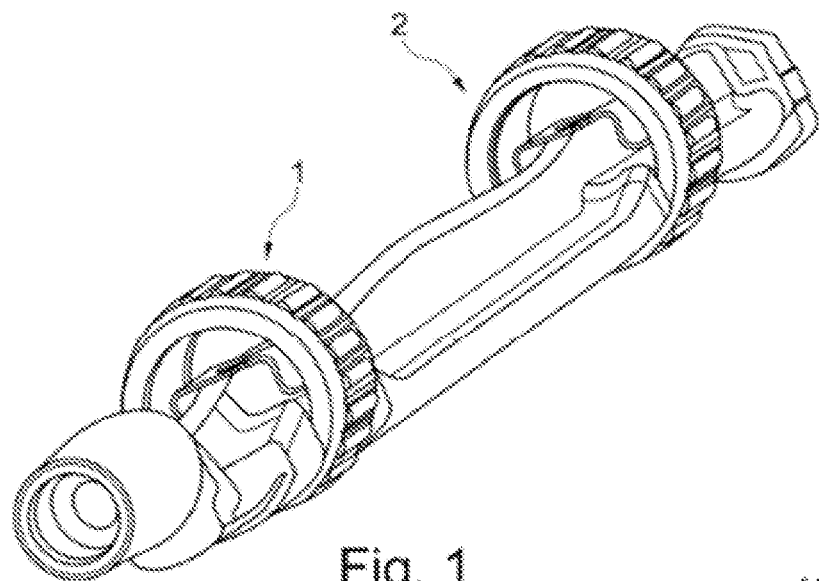
FIG. 1: shows the balance shaft in perspective assembly.
Figure 2:
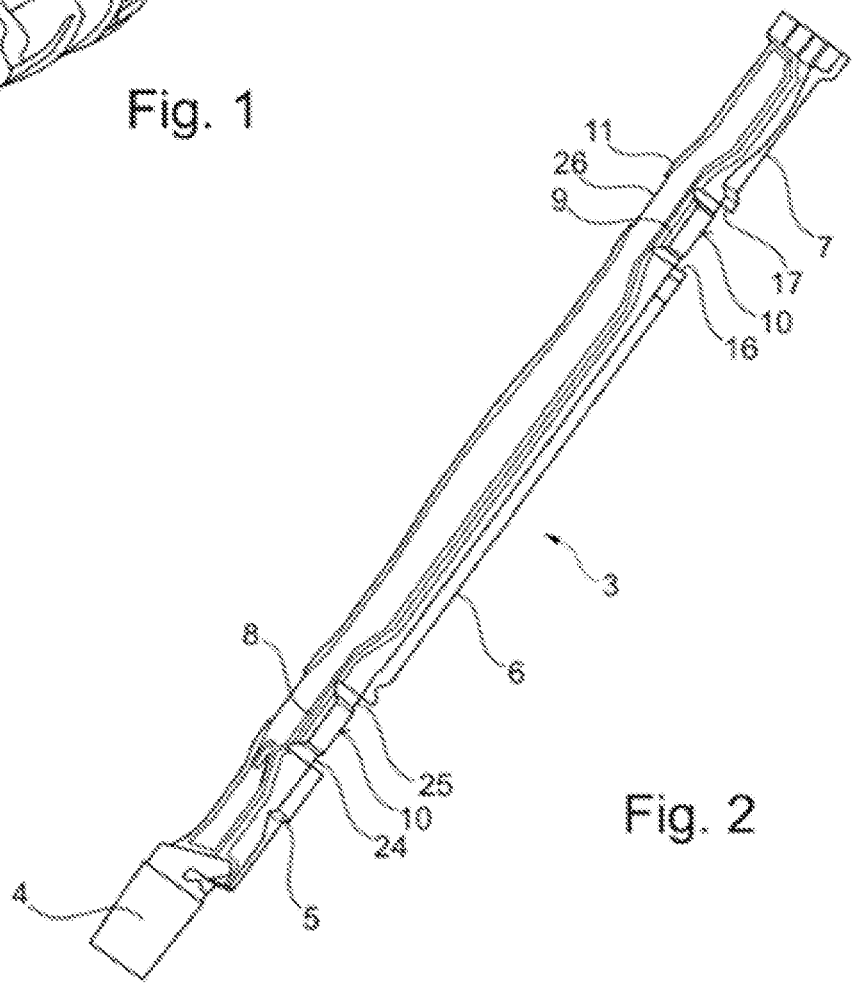
FIG. 2: shows the unbalanced shaft according to FIG. 1 as an individual part.

FIGS. 1 to 6 show components and the assembly of a balance shaft according to the present disclosure, which is radially needle-mounted at two bearing points 1 and 2 in a housing of an internal combustion engine. This balance shaft comprises an unbalanced shaft 3 produced as a cast or forged part with an end drive journal 4 for a drive wheel to be mounted thereon and with unbalanced sections 5, 6, and 7 and with adjoining bearing journals 8 and 9, each of which is respectively connected to two of the unbalanced sections 5 to 7 in the axial region of the bearing points 1, 2. The circumference of the bearing journals 8, 9 is only partially cylindrical, wherein the cylindrical partial circumference 10 is oriented circumferentially toward the shaft imbalance, for the purposes of maximizing the shaft imbalance, in such a way that the unbalance of the unbalanced sections 5 to 7 and the unbalance of the bearing journals 8, 9 are essentially parallel and in the same direction and load each cylindrical partial circumference 10 substantially in the center of the circumference. The (non-cylindrical) partial circumference of the bearing journal 8, 9, which is radially opposite the cylindrical partial circumference 10, hereinafter referred to as the bearing journal back 11, is cleared in relation to the circumferential circle of the cylindrical partial circumference 10 related to the shaft axis of rotation 12, see FIG. 3.

Each bearing point 1, 2 comprises the bearing journal 8 or 9 and a bearing ring 13 surrounding it, a clamping element 14 and a needle roller cage assembly 15, the inner raceway of which is formed by the bearing ring 13. Each bearing ring 13 is fastened to the unbalanced shaft 3 by means of the clamping element 14, which connects the bearing ring 13 radially and axially to the bearing journal 8 or 9. For this purpose, the clamping element 14 is axially connected in a form-fitting manner both to the unbalanced shaft 3 and to the bearing ring 13.

The circumferential circle of the cylindrical partial circumference 10 is respectively smaller than the circumferential circle of the adjacent unbalanced sections 5 and 6 or 6 and 7, wherein both the cylindrical partial circumference 10 and the inner raceway of the bearing ring 13 spring back radially with respect to axial shoulders 16 and 17 of the unbalanced sections 5 to 7. The width of the bearing rings 13 is smaller than the mutual spacing of the axial shoulders 16, 17, which extend circumferentially only partially and essentially symmetrically to the load zone on the cylindrical partial circumference 10 and the bearing ring 13 resting thereon, which is subjected to point load due to the imbalance. In the present case, the circumferential angle of the axial shoulders 16, 17 is significantly smaller than 180°. Each bearing ring 13 is fastened between the axial shoulders 16, 17 with approximately the same distance on both sides, see FIG. 3. The bearing rings 13 are assembled by threading them onto the unbalanced shaft 3 and then positioning and attaching them to the bearing journals 8 or 9.

The clamping element 14 is a metal clip which consists of a spring-hard flat material and is clamped radially under elastic deformation in the free space between the bearing journal back 11 and the bearing ring 13. For this purpose, the clamping element 14 comprises an essentially partially cylindrical section 18, the ends of which merge into two legs 19 and 20 supported on the bearing journal back 11. The section 18 nestles against the inner circumferential surface 21 of the bearing ring 13, and the legs 19, 20 engage around each other for the purpose of mutual locking in the axial direction. The clamping element 14 can alternatively consist of plastic.

The radial joint connection of the bearing ring 13 with the bearing journal 8 or 9 takes place through the radial clamping force of the clamping element 14, which acts on the bearing ring 13 in the direction opposite to the shaft imbalance and consequently clamps it radially against and adhering to the cylindrical partial circumference 10. The axial joint connection of the bearing ring 13 with the bearing journal 8 or 9 takes place by means of an axial form fit of the bearing ring 13 with the clamping element 14 on the one hand and the clamping element 14 with the bearing journal 8 or 9 on the other hand.

The form fit between the bearing ring 13 and the clamping element 14 is formed by full circumferential rims 22 and 23, which extend radially inward at the axial ends of the bearing ring 13 opposite its inner circumferential surface 21 and enclose the partially cylindrical section 18 of the clamping element 14 axially with practically no play.

The form fit between the clamping element 14 and the bearing journal 8 or 9 is formed in that the bearing journal back 11 has a groove 26 with groove walls running transversely to the shaft rotational axis 12, which surround the leg 19 axially with practically no play.

Thus, the axial form-fitting connection of the bearing ring 13 with the bearing journal 8 or 9 on the axially inner guide of the rims 22, 23 on the axial end faces of the partially cylindrical section 18 on the clamping element 14 on the one hand and on the axially outer guide of the clamping element 14 on the groove walls of the groove 26 on the other hand is restricted. The term 'practically free of axial play' is to be understood either as an enclosure free of axial play or an enclosure subject to axial play, the maximum axial clearance of which is such that an axial start-up of the bearing ring 22, 23 directly on the unbalanced shaft 3 is excluded.

The clearance of the bearing ring 13 required on the part of the cylindrical partial circumference 10 is produced by undercuts 24 and 25 which connect the axial shoulders 16 and 17 with the cylindrical partial circumference 10 and in which the rims 22, 23 are received—at least axially—without contact.

The needle roller cage assembly 15 has a cage 27, the axial ends of which are provided with radially inwardly extending projections. The projections are also full circumferential rims 28 and 29 which encompass the end faces of the bearing ring 13 formed by the rims 22 and 23 with little axial play. The axial play is dimensioned such that the axial start-up of the cage 27 on both sides takes place exclusively on the end faces of the bearing ring 13. The axial start-up on both sides with full guidance of the cage 27 on the bearing ring 13 reduces the risk of abrasive cage wear due to cyclical start-up and run-off of and on axial shoulders 16, 17, compared to an alternative design in which a needle roller cage assembly is only guided axially through the only partially peripheral axial shoulders 16 and 17.

As illustrated schematically in FIG. 7, the term 'full circumferential axial start-up' is to be understood as meaning that the cage 27 is supported and guided on the bearing ring 13 on each start-up side at least three contact points 30, the greatest circumferential distance between two adjacent contact points always being smaller than 180°.

In the practical embodiment, the full circumferential axial start-up can—as shown in the previous exemplary embodiment—take place via the practically full-surface contact of the rims 28 with 22 or 29 with 23 on both sides. Alternatively, one of the contact partners can have one or more circumferential recesses (between contacting start-up segments), in the circumferential extent of which there is no axial contact with the other contact partner, the circumferential extent being less than 180° in each case.

The clearance of the rims 28, 29 with respect to the bearing journal 8 and 9 is also ensured by the undercuts 24 and 25, respectively. The cage 27 is made of plastic and—in the present case without a cage lock—is axially slotted in order to be able to expand it circumferentially during assembly on the bearing ring 13.

The inner circumferential surface 21 of the bearing ring 13 is—viewed in the transverse direction on the shaft rotation axis 12—designed to be spherical, and the cylindrical partial circumference 10 is a straight partial cylinder. Due to this contact geometry, the bearing ring 13 can tilt slightly on the cylindrical partial circumference 10 in favor of an operationally optimally aligned inner raceway of the needle roller cage assembly 15.

What is claimed is:

1. A balance shaft assembly comprising:
   an unbalanced shaft comprising a bearing journal, a periphery of the bearing journal including a cylindrical partial periphery oriented toward a shaft imbalance;
   a needle roller cage assembly; and
   a bearing ring extending around the bearing journal, the bearing ring lying against the cylindrical partial periphery and forming an inner raceway of the needle roller cage assembly,
   a cage of the needle roller cage assembly being configured to run on end faces of the bearing ring axially on both sides by radially inwardly extending projections.

2. The balance shaft assembly as recited in claim 1, wherein an axial start-up of the cage on the bearing ring is fully circumferential, wherein the cage is supported on at least three contact points on each side on the bearing ring and a circumferential distance between two adjacent contact points of the at least three contact points is always less than 180°.

3. The balance shaft assembly as recited in claim 1, wherein the radially inwardly extending projections of the cage are full circumferential rims and the end faces of the bearing ring are formed by full circumferential rims extending radially inwardly opposite an inner circumferential surface of the bearing ring, the bearing journal having circumferential undercuts axially on both sides of the cylindrical partial periphery, in which the full circumferential rims of the bearing ring are received without contact.

4. The balance shaft assembly as recited in claim 1, wherein the bearing journal has a bearing journal back lying radially opposite the cylindrical partial periphery and, together with the bearing ring delimits a free space, the balance shaft assembly further comprising a clamping element clamped in the free space, the clamping element clamping the bearing ring radially against the cylindrical partial periphery.

5. The balance shaft assembly as recited in claim 4, wherein the clamping element is configured for securing the bearing ring against axial sliding on both sides on the bearing journal, such that the clamping element is connected in an axially form-fitting manner both to the unbalanced shaft and to the bearing ring.

6. The balance shaft assembly as recited in claim 5, wherein the axially form-fitting manner between the clamping element and the unbalanced shaft is formed by a groove in the bearing journal back, groove walls of the groove axially enclosing axial end faces of the clamping element with either no or low play.

7. The balance shaft assembly as recited in claim 5, wherein the axially form-fitting manner between the clamping element and the bearing ring is formed such that the radially inwardly extending projections of the cage axially enclose axial end faces of the clamping element with either no or low play.

8. A method of forming a balance shaft assembly comprising:
   providing an unbalanced shaft comprising unbalanced sections adjoined by bearing journals, a periphery of each of the bearing journals being partially cylindrical and including a partially cylindrical periphery and a non-cylindrical bearing journal back; and
   installing a bearing ring and a needle roller cage assembly on each of the bearing journals, the bearing rings each lying against the respective partially cylindrical periphery and forming an inner raceway of the respective needle roller cage assembly, each of the needle roller cage assemblies including a cage having radially inwardly extending projections contacting axial end faces of the respective bearing ring axially on both sides.

9. The method as recited in claim 8 further comprising clamping a respective clamping element on each of the bearing journals radially between the non-cylindrical bearing journal back and an inner circumferential surface of the respective bearing ring.

10. A balance shaft assembly comprising:
    an unbalanced shaft comprising unbalanced sections adjoined by a bearing journal, a periphery of the bearing journal being partially cylindrical and including a partially cylindrical periphery and a non-cylindrical bearing journal back;
    a bearing ring extending around the bearing journal, the bearing ring contacting the cylindrical partial periphery; and
    a needle roller cage assembly, the bearing ring forming an inner raceway of the needle roller cage assembly, the needle roller cage assembly including a cage having radially inwardly extending projections contacting axial end faces of the bearing ring axially on both sides.

11. The balance shaft assembly as recited in claim 10 further comprising a clamping element on the bearing journal configured for being positioned radially between the non-cylindrical bearing journal back and an inner circumferential surface of the bearing ring.

12. The balance shaft assembly as recited in claim 11 wherein the clamping element is a metal clip that configured for being clamped radially under elastic deformation in a free space between the non-cylindrical bearing journal back and the inner circumferential surface of the bearing ring.

13. The balance shaft assembly as recited in claim 12 wherein the elastic deformation forces the inner circumferential surface of the bearing ring against the partially cylindrical periphery.

14. The balance shaft assembly as recited in claim 10 wherein radially inwardly extending projections of the cage are formed by circumferential rims of the cage and the axial end faces of the bearing ring are formed by circumferential rims of the bearing ring.

15. The balance shaft assembly as recited in claim 14 wherein the bearing journal includes undercuts on both axial sides of the partially cylindrical periphery, the circumferential rims of the bearing ring being received in the undercuts.

16. The balance shaft assembly as recited in claim 15 wherein the circumferential rims of the bearing ring are axially spaced from the periphery of the bearing journal at the undercuts.

17. The balance shaft assembly as recited in claim 15 wherein the circumferential rims of the cage are radially spaced from the periphery of the bearing journal at the undercuts.

18. The balance shaft assembly as recited in claim 14 further comprising a clamping element on the bearing journal configured for being positioned radially between the non-cylindrical bearing journal back and an inner circumferential surface of the bearing ring, the circumferential rims of the bearing ring axially enclosing a partially cylindrical section of the clamping element.

* * * * *